United States Patent Office 3,033,058
Patented May 8, 1962

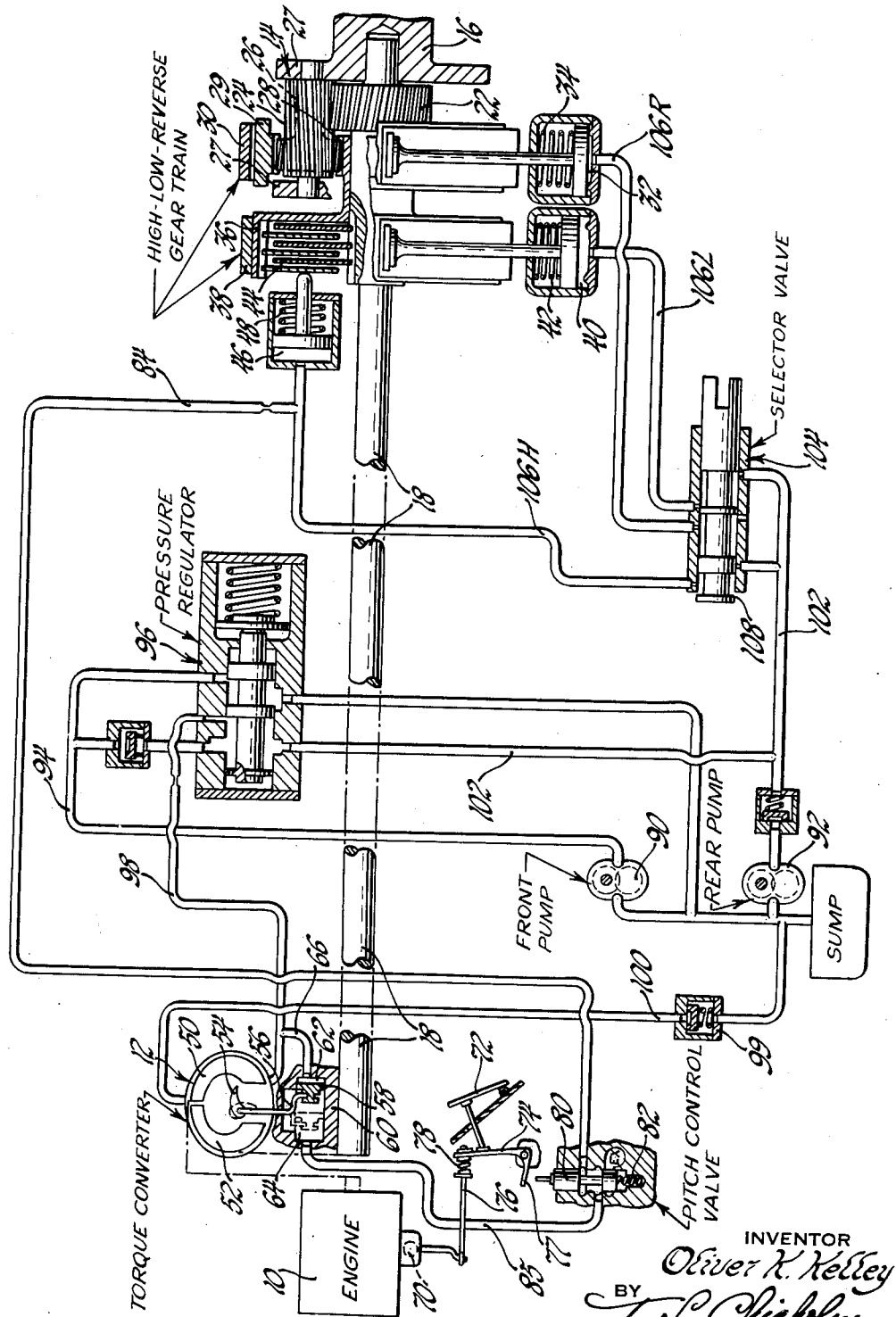

3,033,058
TRANSMISSION
Oliver K. Kelley, Birmingham, Mich., assignor to General Motors Corporation, Detroit, Mich., a corporation of Delaware
Filed Dec. 31, 1954, Ser. No. 479,187
21 Claims. (Cl. 74—730)

This invention relates to the type of power transmission in which a hydrodynamic torque converter drives a change-speed gearing which drives a power output device, such as the drive wheels of an automobile. An example of this general type of transmission is described in my United States Patent 2,818,708, filed December 11, 1947, patented January 7, 1958, the disclosure of which is incorporated herein by reference.

Transmissions of the kind disclosed in that patent have been used extensively and are very satisfactory but they are subject to the limitation that the torque multiplication of the torque converter is dependent solely on the speed of the impeller and the speed of the driven rotor or turbine. There are certain conditions of driving in which it is desired to vary the torque ratio of the converter instantly at the will of the driver and at a given car speed. To put it another way, it is frequently desired to extend the range of speed through which the converter has high torque multiplication, particularly at high speeds, for example, to provide a passing gear. Transmissions of the type shown in the patent cannot be controlled in this way and, accordingly, I proposed an improvement in my application for U.S. Patent S.N. 403,813, filed Jan. 13, 1954, and now Patent No. 2,999,400, the disclosure of which is incorporated herein by reference. In the invention disclosed in that application means is provided for adjusting the blades of a reaction member to change the torque ratio of the converter when desired. In this transmission, however, the torque ratio is adjusted manually without any reference to the condition of the gearing.

It is an object of the present invention to improve the operation of and extend the usefulness of transmissions having change-speed gearing in series with a hydrodynamic torque converter in which the torque multiplication may be varied, particularly by providing a transmission in which the range of torque multiplication of the torque converter may be varied automatically in accordance with the speed ratio of the gearing or with the direction of the drive of the gearing. It is also an object of the invention to provide a transmission in which the torque multiplication of the torque converter can be varied either at will or automatically in response to the torque demand without changing the speed ratio of the gearing.

These and other object of the present invention will be apparent from the following description and accompanying drawings, which latter show schematically one form of transmission and control system therefor, embodying the invention.

Referring to the drawings:

An engine 10 drives a hydrodynamic torque converter 12 which drives an change-speed gearing generally denoted by 14, which in turn drives a power output shaft 16 which may be the propeller shaft of an automobile. Any suitable form of change-speed gearing, particularly one which provides at least two forward speeds and reverse, may be used. The one illustrated diagrammatically, by way of example, is the gearing shown in my patent referred to. The shaft 18 by which the torque converter drives the gearing, includes a sun gear 22, which meshes with a plurality of long planetary pinions 24, the forward ends of which also mesh with short planetary pinions 26, both sets of planetary pinions being mounted on a carrier 27 which drives output shaft 16. The short planetary pinions 26 also mesh with both a reaction sun gear 28 which can turn free on the shaft 18. The short pinions also mesh with a ring gear 29, which latter may be locked to the frame to act as a reaction gear by a reverse brake band 30, which can be set when desired by any suitable expansible chamber motor 32, herein called a servo. The brake is released by its inherent elasticity and by a spring 34. The sun gear 28 is attached to a drum 36 which can be locked to the frame by a low speed brake band 38 operable by a hydraulic servo 40, or released by its inherent elasticity and a spring 42. The reaction sun gear 28 may also be locked to the shaft 18 by a direct drive clutch 44 which may be engaged by a hydraulic servo 46 and released by a spring 48. This gearing provides one to one or high speed forward drive when the clutch 44 is engaged, low forward speed when the band 38 is set and reverse drive at low speed ratio when the band 30 is set.

The torque converter generally designated by 12 may be of any suitable type in which there is means for varying the torque multiplication or torque ratio. Preferably, the torque ratio is varied by changing the pitch of vanes which direct the liquid in the working space. This may be accomplished either by varying the pitch of the blades in a turbine or driven rotor; i.e., as shown in my application S.N. 328,090 filed Dec. 26, 1952, and now abandoned, or by varying the pitch of the blades of a reaction member which may be constructed as shown in said application, or as shown in my application S.N. 403,813 filed Jan. 13, 1954. As illustrated herein, by way of example, the torque converter has an impeller 50, driven by the engine, a turbine 52 connected to drive the shaft 18 and a reaction device which may be constructed as shown in detail in my application S.N. 403,813, and which includes pivoted reaction vanes 54, each mounted on a crank 56. The ends of the cranks are mounted in a circumferential groove in an annular piston 58, which divides a cylinder 60 into two expansible chambers 62 and 64. Each such chamber, with the piston 58, constitutes a servo. The blades 54 and their pivots are disposed radially with respect to the shaft 18 and the arrangement is such that when each blade is at low angle with respect to the axial plane in which its pivot lies, as indicated diagrammatically in full lines in the drawings, it changes the direction of oil through a small angle, and therefore the blades provide low torque multiplication. When each blade makes a high angle with respect to the axial plane in which its pivot lies, as indicated in dotted lines in the drawings, it changes the direction of oil through a large angle and the blades produce high torque multiplication.

I provide means constantly urging the blades toward a position of high angle providing high torque multiplication. In the example shown this is the servo 62 which is constantly connected by the conduit 66 to the converter working space which, for this purpose, is a source of fluid under pressure, as will be explained. The force of the servo 62 may be overcome by the force of the servo 64, which when desired may be supplied with oil under pressure to move the vanes to low angle to provide low torque multiplication. If the areas of the two faces of the piston 58 are equal the space 64 will be supplied with fluid at a higher pressure than the pressure in the space 62.

It is within the scope of the invention to vary the pitch of the blades gradually as desired, or in response to torque demand on the engine but I prefer to have the blades at high angle whenever the gearing 14 is in low speed ratio, whether forward or reverse, and to have the blades normally at low angle whenever the gearing is in high speed forward drive, and to provide for changing the angle of the blades from the position of low torque multiplication to the position of high torque multiplication in response to torque demand on the engine while keeping the gearing in high speed forward drive. This may be accomplished by the control system illustrated in the drawing and described below.

The engine has the usual throttle 70 actuated by the usual accelerator pedal 72 through one arm 74 of a bell crank which urges a throttle control rod 76 to the left, as shown in the drawing, through a lost motion connection such as compression spring 78. The throttle is opened by foot pressure on the pedal 72 and closed by any suitable return spring, not shown. After the throttle is fully open the pedal 72 can be moved still farther against the compression of the spring 78 so that the other arm 77 of the bellcrank operates a kickdown valve 80 normally urged up or open by a spring 82 to a position which supplies oil under pressure from a conduit 84 through conduit 85 to the servo 64. The kickdown valve 82 is held in its upper position by the spring during normal operation of the pedal 72. The pressure in line 84 is greater than the pressure in the converter so that the servo 64 overcomes the servo 62 and holds the vanes 54 in the position of low torque multiplication. Over travel of the pedal 72 moves the valve 80 down to close the conduit 84 and vent the servo 64 through line 85 to exhaust. This leaves the vanes solely under the control of constantly operating servo 62 which moves them to the position of high torque multiplication.

The control system may include the customary front pump 90 driven by the engine and the customary rear pump 92 driven by the propeller shaft 16 which pumps draw oil from the sump. The front pump supplies oil through the conduit 94 to any suitable form of regulating valve, generally denoted by 96, which supplies oil at a constant relatively low pressure to the converter working space through the conduit 98, keeping the converter filled as is well known. The pressure in the converter can be limited by the pop valve 99 in the exhaust conduit 100. The conduit 66 connected to the converter therefore constitutes a source of fluid under relatively low pressure for the servo 62. The regulating valve 96 also at appropriate times supplies oil under a high pressure to the conduit 84 by way of the control system described below. This constitutes a second source of fluid under relatively high pressure which may be connected to the servo 64 by the control valve 80.

The pressure regulating valve 96 also supplies oil under constant pressure by conduit 102 to the manual selector valve 104. The manual valve is arranged to selectively direct oil under pressure through conduit 106H to the servo 46 or through conduit 106L to the servo 40 or conduit 106R to the servo 32. The conduit 84 is connected to the conduit 106H so that whenever the manual valve sets the gearing in high and the kick down valve 80 is in its upper position the servo 64 is supplied with oil to hold the blades in the position of low torque multiplication. Whenever the manual valve directs oil to either the low servo 40 or the reverse servo 32 the high clutch servo 46 is exhausted through exhaust port 108 of the manual valve exhausting the servo 64 and permitting the blades to be returned to the high torque multiplication position by the servo 62.

*Operation*

Whenever it is desired to operate the transmission in low or reverse the manual valve 104 is moved to the appropriate position to energize the selected servo 32 or 40. This places the gearing in either low or reverse in both of which positions the torque demand on the system is likely to be high. In both of these positions the constant pressure of oil from the torque converter working space in the servo 62 holds the blades 54 in the position of high torque multiplication, since the servo 64 is empty because its connection to the clutch servo 46 is not supplied with oil.

During normal forward drive the car may be operated entirely with the gearing in high speed ratio. When this is desired the manual valve 104 is moved to supply oil to the servo 46. This supplies oil to the conduit 84 and throughout the normal range of movement of the throttle the pressure in conduit 84 overcomes the servo 62 to hold the vanes in the position of low torque multiplication. In this phase of operation the inherent multiplication characteristics of the torque converter are relied on to provide a relatively high torque multiplication on starting, the torque multiplication falling off as the speed of the car increases, until a point is reached at which coupling occurs in the converter, when the converter drives at very nearly one-to-one ratio. It is important throughout this range of operation that the range of torque multiplication effected by the angle of the reaction blades corresponds to that of the customary torque converter. This is achieved with the blades in the relatively low torque multiplying position. That is, the relatively low angle position illustrated in FIG. 3 of my application, Serial No. 403,813.

Whenever an unusual degree of torque multiplication in forward high speed drive is required, for example, in response to high torque demand which may be required to give high acceleration at high speed, as in passing another vehicle or going up hill, the torque multiplication of the converter at that speed is increased by shifting the blades to the high angle position which is accomplished by pressing the throttle pedal 72 past the wide open position.

This arrangement provides means for increasing the torque multiplication of the torque converter when desired or in response to torque demand without affecting the ratio of the gearing. It also provides means for increasing the torque multiplication of the converter automatically whenever the gearing is conditioned for low speed ratio.

What is claimed is:

1. The combination of a hydrodynamic torque converter which drives change speed gearing, said gearing when driven by the torque converter being adapted to drive a power output member at a plurality of speed ratios, the torque converter having a bladed member in which the pitch of the blades is adjustable to provide varying degrees of torque multiplication, means for selecting the speed ratio of the gearing and means responsive to the selection of one speed ratio of the gearing for determining the pitch of the blades.

2. The combination of a hydrodynamic torque converter which drives change speed gearing, said gearing when driven by the torque converter being adapted to drive a power output member at a plurality of speed ratios, the converter having an impeller, a driven rotor and reaction members of adjustable pitch which provide varying degrees of torque multiplication, means for selecting the ratio of the gearing, and means responsive to the selection of one speed ratio of the gearing for determining the pitch of the vanes.

3. The combination of a hydrodynamic torque converter which drives change speed gearing, said gearing when driven by the torque converter being adapted to drive a power output member at a plurality of speed ratios, the converter having an impeller, a driven rotor and reaction members of adjustable pitch which provide varying degrees of torque multiplication, means for determining the ratio of the gearing, and means responsive to decreasing the speed ratio of the gearing for decreasing the pitch of the vanes.

4. The combination of a hydrodynamic torque converter which drives change speed gearing adapted to drive a power output member at a relatively high and at a relatively low speed ratio, the torque converter including means for circulating fluid over hydrodynamic means which is adjustable to provide relatively large and relatively small changes between the direction of fluid entering said adjustable means and the direction of fluid leaving the adjustable means, selector means for conditioning the gearing to drive at high and low speed ratios, means constantly urging the adjustable means of the converter toward a position providing a relatively large change between said directions, means responsive to the gearing being in high speed ratio for exerting a force on the adjustable means overcoming said urging means and holding the adjustable means in a position providing a relatively small change between said directions, and means responsive to changing the gearing from high speed forward drive for removing said overcoming force from the adjustable means and moving the adjustable means to a position providing a relatively large change between said directions.

5. The combination of a hydrodynamic torque converter which drives change speed gearing adapted to drive a power output member at a relatively high and at a relatively low speed ratio, the torque converter including means for circulating fluid over hydrodynamic means which is adjustable to provide relatively large and relatively small changes between the direction of fluid entering said adjustable means and the direction of fluid leaving the adjustable means, selector means to drive at conditioning the gearing for high and low speed ratios, means constantly urging the adjustable means of the converter to a position providing a relatively large change between said directions, means responsive to the gearing being in high speed ratio for exerting a force on the adjustable means overcoming said urging means and holding the adjustable means in a position providing a relatively small change between said directions, and means manually operable for removing said overcoming force from the adjustable means and moving the adjustable means to a position providing a relatively large change between said directions.

6. The combination of a hydrodynamic torque converter which drives change speed gearing adapted to drive a power output member at a relatively high and at a relatively low speed ratio, the torque converter including means for circulating fluid over hydrodynamic means which is adjustable to provide relatively large and relatively small changes between the direction of fluid entering said adjustable means and the direction of fluid leaving the adjustable means, selector means for conditioning the gearing for high and low speed ratios, means constantly urging the adjustable means of the converter to a position providing a relatively large change between said directions, means responsive to the gearing being in high speed ratio for exerting a force on the adjustable means overcoming said urging means and holding the adjustable means in a position providing a relatively small change between said directions, and manually operable means for removing said overcoming force from the adjustable means independently of the selector means and adjusting the torque converter to provide a relatively large change between said directions while the gearing remains conditioned for high speed forward drive.

7. The combination of an engine driving a hydrodynamic torque converter which drives change speed gearing adapted to drive a power output member at relatively high and relatively low speed ratios, a fuel control member for the engine, the torque converter including means for circulating fluid over hydrodynamic means which is adjustable to provide relatively large and relatively small changes between the direction of fluid entering said adjustable means and the direction of fluid leaving the adjustable means, selector means for conditioning the gearing for high and low speed ratios, means constantly urging the adjustable means of the converter to a position providing a relatively large change between said directions, means responsive to the gearing being in high speed ratio for exerting a force on the adjustable means overcoming said urging means and holding the adjustable means in a position providing a relatively small change between said directions, and means independent of the selector means and responsive to a predetermined position of the fuel control member for removing said overcoming force from the adjustable means and moving the adjustable means to a position providing a relatively large change between said directions while the gearing is in high speed ratio.

8. The combination of an engine driving a hydrodynamic torque converter which drives change speed gearing adapted to drive a power output member at relatively high and relatively low speed ratios, a movable fuel control member for the engine, the torque converter including means for circulating fluid over hydrodynamic means which is adjustable to provide relatively large and relatively small changes between the direction of fluid entering said adjustable means and the direction of fluid leaving the adjustable means, selector means for conditioning the gearing for high and low speed ratios, means constantly urging the adjustable means of the converter to a position providing a relatively large change between said directions, means responsive to the gearing being in high speed ratio for exerting a force on the adjustable means overcoming said urging means and holding the adjustable means in a position providing a relatively small change between said directions, and means independent of the selector means and responsive to a predetermined movement of the fuel control member in fuel-increasing direction for removing said overcoming force from the adjustable means and moving the adjustable means to a position providing a relatively large change between said directions while the gearing is in high speed ratio.

9. The combination of an engine driving a hydrodynamic torque converter which drives change speed gearing adapted to drive a power output member at relatively high and relatively low speed ratios, the torque converter including means for circulating fluid over hydrodynamic means which is adjustable to provide relatively large and relatively small changes between the direction of fluid entering said adjustable means and the direction of fluid leaving the adjustable means, selector means for conditioning the gearing for high and low speed ratios, means constantly urging the adjustable means of the converter to a position providing a relatively large change between said directions, means responsive to the gearing being in high speed ratio for exerting a force on the adjustable means overcoming said urging means and holding the adjustable means in a position providing a relatively small change between said directions, and means independent of the selector means and responsive to torque demand on the engine for removing said overcoming force from the adjustable means and moving the adjustable means to a position providing a relatively large change between said directions while the gearing is in high speed ratio.

10. The combination of a hydrodynamic torque converter which drives change speed gearing, a source of fluid under pressure, fluid pressure operated means for conditioning the gearing for high speed forward drive, the torque converter having means for circulating fluid over hydrodynamic means which is adjustable to provide relatively large and relatively small changes between the direction of fluid entering said adjustable means and the direction of fluid leaving the adjustable means, means constantly urging the adjustable means of the torque converter toward a position providing a relatively large change between said directions, second fluid pressure operated means for overcoming the force of the urging means and positioning the adjustable means of the torque converter to provide a relatively small change between said directions, and means for admitting fluid from said source to both said fluid pressure operated means thereby to condition the gearing for high speed forward drive and adjust the torque converter to provide a relatively large change between said directions.

11. The combination of a hydrodynamic torque converter which drives change speed gearing, a source of fluid under pressure, fluid pressure operated means for conditioning the gearing for high speed forward drive, the torque converter having means for circulating fluid over hydrodynamic means which is adjustable to provide relatively large and relatively small changes between the direction of fluid entering said adjustable means and the direction of fluid leaving the adjustable means, means constantly urging the adjustable means of the torque converter toward a position providing a relatively large change between said directions, second fluid pressure operated means for overcoming the force of the urging means and positioning the adjustable means of the torque converter to provide a relatively small change between said directions, means for admitting fluid from said source to both said fluid pressure operated means thereby to condition the gearing for high speed forward drive and adjust the torque converter to provide a relatively small change between said direction, and means for exhausting the second fluid pressure operated means independently of the first fluid pressure operated means to adjust the torque converter to provide a relatively large change between said directions while the gearing is conditioned for high speed forward drive.

12. The combination of a hydrodynamic torque converter which drives change speed gearing, a source of fluid under pressure, a first servo for conditioning the gearing for high speed forward drive, the combination including means for conditioning the gearing for low speed forward drive and for reverse, the torque converter having adjustable means to provide relatively high and relatively low torque multiplication, a second servo constantly connected to the source of pressure and urging the adjustable means toward a position providing high torque multiplication, a third servo adapted to overcome the force of the second servo and to position the adjustable means for low torque multiplication, and means for admitting fluid from said source to both the first and third servos to condition the gearing for high speed forward drive and adjust the converter for low torque multiplication.

13. The combination of a hydrodynamic torque converter which drives change speed gearing, a first source of fluid under pressure, a second source of fluid under pressure, a first servo for conditioning the gearing for high speed forward drive, the combination including means for conditioning the gearing for low speed forward drive and for reverse, the torque converter having adjustable means to provide relatively high and relatively low torque multiplication, a second servo constantly connected to the second source and urging the adjustable means toward a position providing high torque multiplication, a third servo adapted to overcome the force of the second servo and to position the adjustable means for low torque multiplication and means for connecting both the first and third servos to the first source to condition the gearing for high speed forward drive and adjust the converter for low torque multiplication.

14. The combination of a hydrodynamic torque converter which drives change speed gearing, a source of fluid under relatively high pressure, a source of fluid under relatively low pressure, a first servo for conditioning the gearing for high speed forward drive, the combination including means for conditioning the gearing for low speed forward drive and for reverse, the torque converter having adjustable means to provide relatively high and relatively low torque multiplication, a second servo constantly connected to the low pressure source and urging the adjustable means toward a position providing high torque multiplication, a third servo adapted to overcome the force of the second servo and to position the adjustable means for low torque multiplication and means for connecting both the first and third servos to the high pressure source to condition the gearing for high speed forward drive and adjust the converter for low torque multiplication.

15. A power transmission including the combination of a hydrodynamic torque converter which drives change speed gearing, a first source of liquid under pressure for controlling the transmission, a second source of liquid under pressure supplying working liquid to the converter, a first servo for conditioning the gearing for high speed forward drive, the combination including means for conditioning the gearing for low speed forward drive and for reverse, the torque converter having adjustable means to provide relatively high and relatively low torque multiplication, a second servo constantly connected to the second source and urging the adjustable means toward a position providing high torque multiplication, a third servo adapted to overcome the force of the second servo and to position the adjustable means for low torque multiplication and means for connecting both the first and third servos to the first source to condition the gearing for high speed forward drive and adjust the converter for low torque multiplication.

16. The combination of a hydrodynamic torque converter which drives change speed gearing adapted to drive a power output member forward at a relatively high speed ratio, forward at a relatively low speed ratio and in reverse; the torque converter including means for circulating fluid over hydrodynamic means which is adjustable to provide relatively large and relatively small changes between the direction of fluid entering said adjustable means and the direction of fluid leaving the adjustable means; selector means for conditioning the gearing to drive forward in either ratio and in reverse; and means responsive to the selected condition of the gearing for adjusting the adjustable means of the converter to provide a relatively small change between said directions when the gearing is in high forward, and to provide a relatively large change between said directions both when the gearing is in low forward and in reverse.

17. The combination of an engine driving a hydrodynamic torque converter which drives change speed gearing adapted to drive a power output member at a relatively high forward speed, at a relatively low forward speed and in reverse; a fuel control device for the engine; the torque converter including an impeller, a driven rotor and a reaction member, the reaction member having variable pitch vanes adapted to provide relatively high and relatively low torque multiplication; a source of fluid under pressure, a first serve for conditioning the gearing for forward and high speed drive; the combination including means for conditioning the gearing for low speed forward drive and for reverse drive; means constantly urging the variable pitch vanes to a low pitch position providing high torque multiplication; a second servo for overcoming the action of the constantly urging means and holding the vanes in a high pitch position providing low torque multiplication; a manually operated valve for connecting both said servos to the source of pressure to condition the gearing for forward high speed ratio and to position the vanes in high pitch; a manually operable valve movable to a first position in which it permits communication between the source of fluid pressure and the second servo and movable to a second position in which it prevents communication between the source of fluid pressure and the second servo and exhausts the second servo, and a connection between the manually operated valve and the fuel control device for moving the last mentioned valve to its second position upon predetermined movement of the fuel control device.

18. A transmission comprising in combination a hydrodynamic torque transfer device which includes impeller and turbine members and movable vanes for controlling the transfer of torque from the impeller member to a turbine member; an output member; a torque transmitting connection from a turbine member to the output member; a first fluid pressure chamber for engaging said connection; a second fluid pressure chamber for moving the vanes; a source of fluid under pressure; a first conduit adapted to connect the source to the first chamber; a second conduit adapted to connect the source to the second chamber; and means responsive to the pressure in the first chamber for controlling passage through the second conduit.

19. The combination of a hydrodynamic torque converter which drives change speed gearing adapted to drive a power output member at a plurality of speed ratios, the torque converter including means for circulating fluid over hydrodynamic means which is adjustable to provide a plurality of degrees of change between the direction of the fluid leaving one of said members and the direction of the fluid entering the other of said members, means for selectively establishing drive through the gearing at a plurality of ratios, means responsive to the establishment of drive through one ratio of the gearing for adjusting the adjustable means to provide one degree of change between said directions, and means responsive to the establishment of drive through another ratio of the gearing for adjusting the adjustable means to provide another degree of change between said directions.

20. The combination of a hydrodynamic torque converter which drives change speed gearing adapted to drive a power output member at a plurality of speed ratios; the torque converter having an impeller member, a driven rotor member and reaction vanes which are adjustable to provide a plurality of degrees of change between the direction of the fluid leaving one of said members and the direction of the fluid entering the other of said members; means for selectively establishing drive through the gearing at a plurality of ratios, means responsive to the establishment of drive through one ratio of the gearing for positioning the vanes to provide one degree of change between said directions, and means responsive to the establishment of drive through another ratio of the gearing for positioning the vanes to provide a different degree of change between said directions.

21. In a motor vehicle transmission which includes a hydrodynamic torque transmitting device having an input member, an output member, and means for circulating liquid to transfer torque between the input and output members, the combination of a movable adjusting element for controlling the flow of liquid to vary the change between the direction of the fluid leaving one of said members and the direction of the fluid entering the other of said members, means normally positioning the adjusting element to provide a relatively small change between said directions, the transmission includes means for establishing forward and reverse drive and means responsive to establishing reverse drive to position the adjusting element to provide a relatively large change between said directions.

References Cited in the file of this patent
UNITED STATES PATENTS

| | | |
|---|---|---|
| 2,205,794 | Jandasek | June 25, 1940 |
| 2,327,647 | Jandasek | Aug. 24, 1943 |
| 2,354,596 | Jandasek | July 25, 1944 |
| 2,570,889 | Van Lammeren | Oct. 9, 1951 |
| 2,675,102 | Robinson | Apr. 13, 1954 |
| 2,707,887 | Slack | May 10, 1955 |
| 2,726,557 | Ackerman | Dec. 13, 1955 |

UNITED STATES PATENT OFFICE
CERTIFICATE OF CORRECTION

Patent No. 3,033,058                      May 8, 1962

Oliver K. Kelley

It is hereby certified that error appears in the above numbered patent requiring correction and that the said Letters Patent should read as corrected below.

Column 5, line 20, for "to drive at" read -- for --; line 21, for "for" read -- to drive at --; column 8, line 42, for "serve" read -- servo --; column 10, line 15, for "includes" read -- including --.

Signed and sealed this 18th day of September 1962.

(SEAL)
Attest:

ERNEST W. SWIDER                      DAVID L. LADD
Attesting Officer                          Commissioner of Patents